(12) United States Patent
Falsetti et al.

(10) Patent No.: US 10,328,746 B2
(45) Date of Patent: Jun. 25, 2019

(54) WHEEL HUB UNIT WITH A CENTRAL NUT

(71) Applicant: Aktiebolaget SKF, Gothenburg (SE)

(72) Inventors: Fabio Falsetti, Turin (IT); Michele Appendini, Villastellone (IT); Maurizio Bertola, Piscina (IT); Alessandro Galeazzi, Pinerolo (IT)

(73) Assignee: Aktiebolaget SKF, Göteborg (SE)

( * ) Notice: Subject to any disclaimer, the term of this patent is extended or adjusted under 35 U.S.C. 154(b) by 68 days.

(21) Appl. No.: 15/642,700

(22) Filed: Jul. 6, 2017

(65) Prior Publication Data
US 2018/0015781 A1    Jan. 18, 2018

(30) Foreign Application Priority Data

Jul. 15, 2016    (IT) .......................... 102016000074336

(51) Int. Cl.
*B60B 3/14*    (2006.01)
*B60B 27/06*    (2006.01)
*F16B 39/08*    (2006.01)

(52) U.S. Cl.
CPC ............ *B60B 3/142* (2013.01); *B60B 27/065* (2013.01); *F16B 39/08* (2013.01); *B60B 2900/3312* (2013.01)

(58) Field of Classification Search
CPC .................................. B60B 3/14; B60B 3/142
See application file for complete search history.

(56) References Cited

U.S. PATENT DOCUMENTS

| | | | | |
|---|---|---|---|---|
| 1,148,987 A * | 8/1915 | Pugh et al. | ............... | B60B 3/18 |
| | | | | 301/35.58 |
| 1,646,352 A * | 10/1927 | Denham | ................. | B60B 37/10 |
| | | | | 301/35.55 |
| 2,202,080 A * | 5/1940 | Baker | ...................... | B60B 3/14 |
| | | | | 152/48 |
| 5,211,448 A * | 5/1993 | Hayashi | .................... | B60B 3/10 |
| | | | | 301/35.55 |
| 5,431,485 A * | 7/1995 | Hayashi | .................... | B60B 3/10 |
| | | | | 301/105.1 |
| 5,573,311 A * | 11/1996 | Clohessy | ................ | F16B 39/32 |
| | | | | 301/105.1 |
| 5,622,465 A | 4/1997 | Junkers | | |
| 2013/0020855 A1* | 1/2013 | Becker | ................... | B60B 3/165 |
| | | | | 301/35.63 |

FOREIGN PATENT DOCUMENTS

DE    102014116227 A1    4/2015

* cited by examiner

*Primary Examiner* — Jason R Bellinger
(74) *Attorney, Agent, or Firm* — Bryan Peckjian; SKF USA Inc. Patent Dept.

(57) ABSTRACT

A wheel hub unit having a central hub and a single central nut that includes respective shaped profiles radially oriented facing towards an axis (A) is provided. The wheel hub unit further includes an anti-unscrewing element interposed between the central hub and the single central nut to prevent accidental unscrewing of the single central nut. The anti-unscrewing element is provided with respective shaped profiles both radially oriented facing away from the axis (A) to engage with shaped profiles.

6 Claims, 2 Drawing Sheets

US 10,328,746 B2

WHEEL HUB UNIT WITH A CENTRAL NUT

CROSS REFERENCE TO RELATED APPLICATIONS

This application claims priority to Italian patent application no. 102016000074336 filed on Jul. 15, 2016, the contents of which are fully incorporated herein by reference.

FIELD OF THE INVENTION

The present invention relates to a wheel hub unit with a central nut.

BACKGROUND OF THE INVENTION

Wheel hub units with a central nut may include a central hub provided with a flanged portion and an external threaded profile arranged at a free end opposite the flanged portion, a single nut provided with an internal threaded profile which is screwed, in such a way that it can be unscrewed, on the external threaded profile so as to clamp at least one wheel rim between itself and the flanged portion, and an anti-unscrewing element interposed between the central hub and the single nut to prevent accidental unscrewing of the single nut and the consequent risk of losing the wheel.

German patent application DE 10 2014 116 227 discloses a wheel hub unit with a central nut, in which both the free end of the central hub and the single nut have respective shaped profiles. In particular, the free end of the central hub is provided with a respective radially external shaped profile which is made axially on the external threaded profile, while the single nut is provided with a respective radially internal shaped profile which is made on the inside of the central nut in such a way that it axially overlaps the radially external shaped profile once the single nut is screwed onto the central hub.

German patent application DE 10 2014 116 227 also discloses an anti-unscrewing element comprising two respective shaped profiles, one radially internal and one radially external, axially aligned with one another in such a way as to simultaneously engage the radially external shaped profile of the central hub and the radially internal shaped profile of the single nut so as to prevent any possible rotation of the single nut, preventing it from becoming unscrewed accidentally.

Wheel hub units of the type described above are usually used preferably for sports tires, i.e. tires with a wide tread, and although the axial footprint, or the radial footprint, do not seem to be a very big technical problem, any reduction in the latter would result in a reduction in the weight of the wheel hub unit to the full benefit of a reduction in the suspended mass, the kinetic energy, as well as a saving on the materials used.

BRIEF SUMMARY OF THE INVENTION

It is an aim of the present invention to produce a wheel hub unit with a central nut which does not have the above-mentioned disadvantages.

A wheel hub unit with a central nut produced according to the present invention has the features described in the attached claims.

BRIEF DESCRIPTION OF THE SEVERAL VIEWS OF THE DRAWING

The invention shall now be described with reference to the attached drawings which illustrate a non-limiting embodiment of the invention, in which.

DETAILED DESCRIPTION OF THE INVENTION

Figure 1:
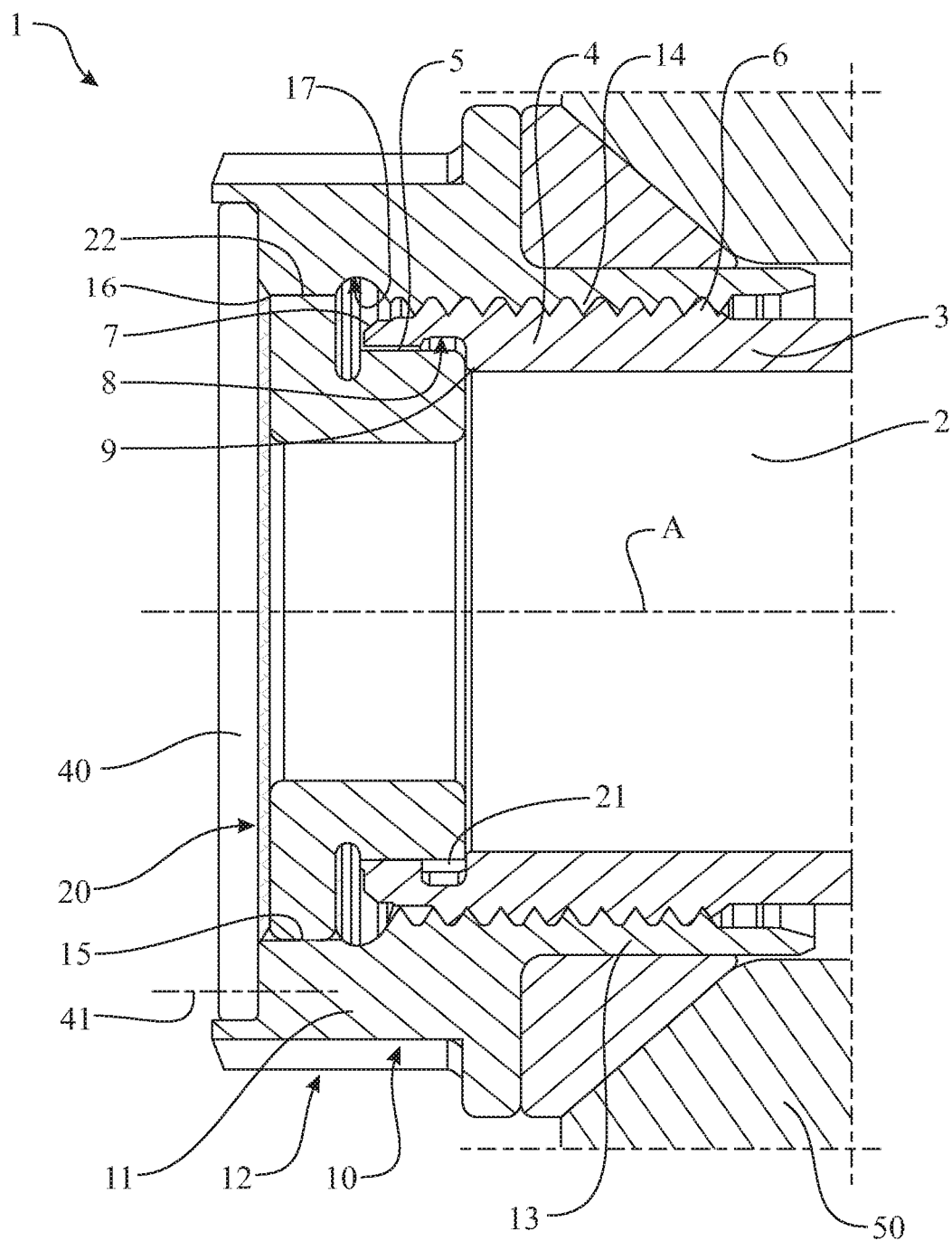
FIG. 1 presents a schematic view, with parts in section and parts removed for clarity, of a preferred embodiment provided by way of non-limiting exemplary embodiment of the wheel hub unit with a central nut.

With reference to the attached figures, the reference sign 1 indicates a wheel hub unit as a whole.

The wheel hub unit 1 provides a central hub 2 provided with a flange (not shown), transverse to an axis A of rotation of the wheel hub unit 1, and a tubular body 3, which extends along the axis A of rotation from the flange (not shown) and has a free end 4 provided with an internal shaped profile 5 and an external threaded profile 6 arranged substantially axially in series along the axis A and radially oriented facing away from one another.

In particular, the shaped profile 5 is arranged around the axis A on the inside of the tubular body 3, starting from an input edge 7 of the end 4, and is axially delimited on the side opposite to the edge 7 by a groove 8 and, successively, by a shoulder 9, while the external threaded profile 6 extends around the axis A on the outside of the tubular body 3, from a position which is axially set back from the input edge 7.

The wheel hub unit 1 further provides a single central nut 10 made up of: a tubular main body 11 defined externally by a polygonal surface 12; and a tubular appendage 13 extending along the axis A from the main body 11.

The single central nut 10 has an internal threaded profile 14, which extends substantially all along the tubular appendage 13 and over part of the tubular main body 11 and which is screwed, in such a way that it can be unscrewed, on the external threaded profile 6 of the central hub 2; and a respective shaped profile 15, which is arranged around the axis A on the inside of the main body 11 starting from an input edge 16 of the main body 11, and which is axially delimited on the side opposite to the input edge 16 by a groove 17 and, then, by the internal threaded profile 14.

The shaped profile 15 of the single central nut 10 and the shaped profile 5 of the central hub 2 are both oriented facing towards the axis A and the shaped profile 15 has an average circumference of dimensions greater than the dimensions of an average circumference of the shaped profile 5 of the central hub 2: the smaller the difference between the dimensions of these average circumferences, the greater the saving in terms of weight for the wheel hub unit 1.

The wheel hub unit 1 further provides an anti-unscrewing element 20, which is interposed between the central hub 2 and the single central nut 10 to prevent accidental unscrewing of the single central nut 10, and which provides two shaped profiles 21 and 22, both radially oriented facing away from the axis A of the central hub 2 so as to engage with the shaped profile 5 of the central hub 2 and with the shaped profile 15 of the single central nut 10, respectively.

The shaped profile 21 and the shaped profile 22 are both oriented facing away from the axis A and the shaped profile 21 has an average circumference of dimensions smaller than the dimensions of an average circumference of the shaped profile 22 and, as discussed above, the smaller the difference between the dimensions of these average circumferences, the greater the saving in terms of weight for the wheel hub unit 1. The dimensions and the shape of the shaped profile 21 and the shaped profile 22 are however such that they allow them to be coupled with the shaped profile 5 of the central hub 2 and with the shaped profile 15 of the single central nut 10, respectively.

Figure 2:
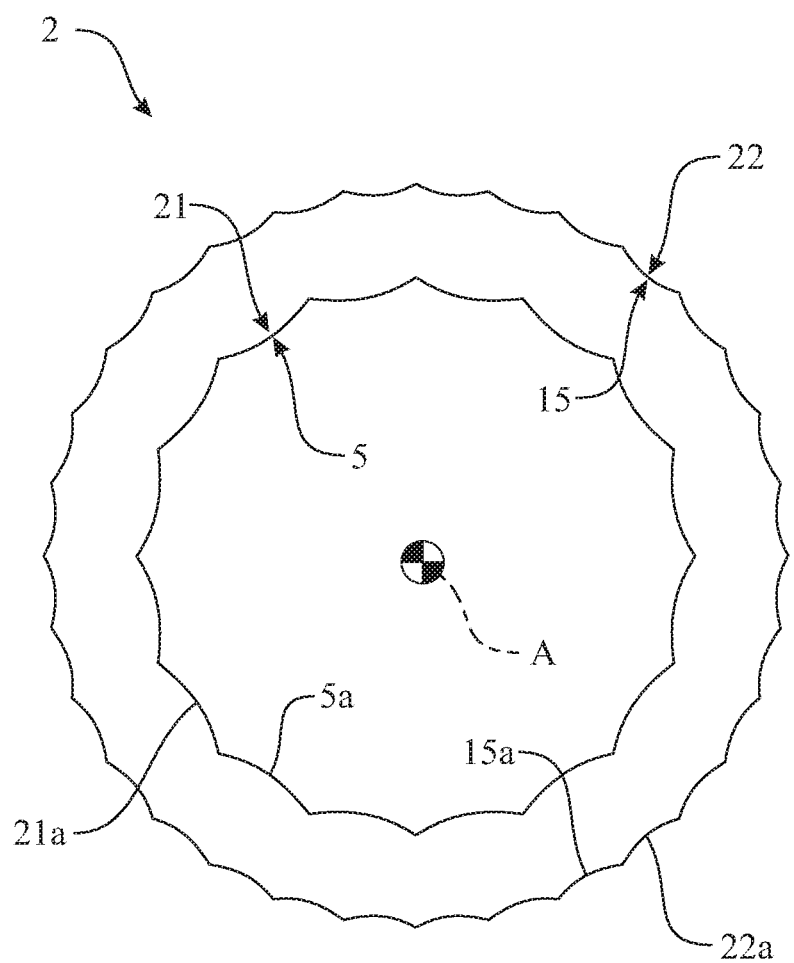
FIG. 2 presents, schematically, a detail of the wheel hub unit with a central nut of FIG. 1.

With reference also to FIG. 2, all the shaped profiles 5, 15, 21 and 22 are formed by a plurality of teeth 5*a*, 15*a*, 21*a* and 22*a* uniformly distributed around the axis A and a number N1 of teeth 5*a* and 21*a* of the shaped profiles 5 and 21 is different from, as well as less than or, preferably, but not necessarily, greater than a number N2 of teeth 15*a* and 22*a* of the shaped profiles 15 and 22. In particular, the number N1 of teeth 5*a* and 21*a* and the number N2 of teeth 15*a* and 22*a* differ from one another by a number N, the value of which is between one and ten. The polygonal shape of the teeth 5*a*, 15*a*, 21*a* and 22*a* shown in FIG. 2 is purely indicative since the same technical effects are achieved with teeth with a wavy shape or with a Greek-style pattern or lobed teeth.

In the case where the number N1 is higher than the number N2, the accuracy of the coupling between the shaped profiles 5 and 21, or 15 and 22, will be better the lower the value of the ratio between the number N and the number N1, or N/N1, and will be even better the closer the value of the ratio between the number N2 and the number N1, or N2/N1, is to one.

By contrast, in the case where the number N1 is lower than the number N2, the accuracy of the coupling between the shaped profiles 5 and 21, or 15 and 22, will be better the lower the value of the ratio between the number N and the number N2, or N/N2, and will be even better the closer the value of the ratio between the number N1 and the number N2, or N1/N2, is to one.

Once the single central nut 10 is screwed onto the central hub 2 in such a way as to axially clamp, between the nut and the flange (not shown), a center disc, shown schematically and designated by the number 50, of a wheel (known and not shown), the anti-unscrewing element 20 is interposed in an axial direction between the single central nut 10 and the central hub 2 in such a way that the shaped profiles 5 and 15 become substantially axially aligned with the shaped profiles 21 and 22, respectively, and in such a way as to connect the shaped profiles 5 and 15 with the shaped profiles 21 and 22, respectively. The axial position of the anti-unscrewing element 20 is determined by the shoulder 9 against which the anti-unscrewing element 20 comes into axial abutment: in this way, an axial length of the shaped profiles 21 and 22 will not need to be that different to an axial length of the shaped profiles 5 and 15.

Given that fully screwing the single central nut 10 on the central hub 2 does not make it possible to determine, a priori, the final angular position of the single central nut 10 with respect to the central hub 2, or the angular position of the profile 5 with respect to the profile 15, since the reciprocal position may be influenced both by the axial thickness of the center disc 50, and by the properties of the external threaded profile 6 and the internal threaded profile 14, for example the pitch thereof or the helical path thereof, the angular coupling of the anti-unscrewing element 20 simultaneously with both the single central nut 10 and the central hub 2 is made possible by the fact that the number N1 of teeth 5*a*, 21*a* is different to the number N2 of teeth 15*a*, 22*a*. The coupling, which renders the single central nut 10 and the central hub 2 angularly integral, thereby preventing any possible accidental unscrewing of the single central nut 10, is achieved by rotating, during assembly, the anti-unscrewing element 20 about the axis A until an angular position of the anti-unscrewing element 20 is found in which, simultaneously, the angular position of the shaped profiles 21 and 22 matches the angular position of the shaped profiles 5 and 15, respectively. Even though the numbers N1 and N2 are different to one another, there will always be an angular position of the anti-unscrewing element 20 that will allow simultaneous coupling of the shaped profiles 5 and 21, and 15 and 22: aligning a tooth 15*a* of the profile 15 with a tooth 5*a* of the profile 5, the next tooth 15*a* of the profile 15 will not be aligned with the next tooth 5*a* of the profile 5, since, by virtue of the difference N between the number N1 and the number N2, there will be a difference of a portion of a tooth 5*a* or 15*a* between the two profiles 5 and 15 and the difference of a portion of a tooth increases angularly over the profile 5 until it reaches the end. The difference N ensures that it is possible to find a single possibility of alignment of all the teeth 5*a* and 15*a* with the teeth 21*a* and 22*a*, respectively, in which the shaped profile 21 of the anti-unscrewing element 20 will fit perfectly with the shaped profile 5, and the shaped profile 22 of the anti-unscrewing element 20 will fit perfectly with the shaped profile 15.

Thanks to the axially aligned position of the shaped profiles 5 and 21, and 15 and 22, and the position of the shaped profile 5 radially facing in the opposite direction to the external threaded profile 6, it is possible to produce a wheel hub unit 1 which is more compact and, therefore, also more lightweight because less metal may be used. Above all, given that the wheel hub unit 1 described above is preferably for use with sports tires, or with high performance vehicles, the possibility of having the shaped profiles 5 and 21 axially aligned with the shaped profiles 15 and 22 makes it possible to substantially disassociate the dimensions of the average circumference of the shaped profiles 5 and 21 from the dimensions of the average circumference of the shaped profiles 15 and 22, to the full benefit of reducing the weight and the circumferential dimensions of the shaped profiles 5 and 21, and 15 and 22. The fact that the dimensions of the average circumferences of the shaped profiles 5 and 21 and the shaped profiles 15 and 22 may be optimized independently of one another makes the wheel hub unit 1 and the anti-unscrewing element 20 described above particularly suitable for use in high performance vehicles since the kinetic energy and the polar mass moments involved in acceleration and deceleration in this type of motor vehicle are particularly high and, since the kinetic energy and the polar mass moments are proportional to the square of the radius of the circumferences, they are very much influenced by the dimensions of the latter.

Lastly, the wheel hub unit 1 provides a cover 40, which is screwed using screws 41 (shown schematically) onto the single central nut 10 and is arranged axially just before the anti-unscrewing element 20. The cover 40, preferably, axially locks the anti-unscrewing element 20 in its mounted position shown in FIG. 1 and described above. Indeed, mounting of the anti-unscrewing element 20 involves interference on both of its shaped profiles 21 and 22, and the interference is more than enough to keep the anti-unscrewing element 20 in its mounted position.

It should be understood that the invention is not limited to the single embodiment described herein, as the anti-unscrewing element 20 of the invention above may be used for all purposes in which a wheel hub unit 1 is provided with a wheel support, such as a central hub 2 to be precise, threaded externally with the external threaded profile 6, and an axial locking element, such as a single central nut 10 to be precise, threaded internally with the internal threaded profile 14 and screwed, in such a way that it can be unscrewed, on the external threaded profile 6. For such purposes, where it is necessary to ensure the wheel support and the axial locking element are angularly integral, the anti-unscrewing element 20 is interposed between the wheel support and the axial locking element and the invention provides two shaped profiles 5 and 15 both radially oriented facing towards an axis A, and made in the wheel support and in the locking element, respectively; and two further shaped profiles 21 and 22 both radially oriented facing away from an axis A so as to engage with the shaped profiles 5 and 15, respectively, and make the wheel support and the locking element angularly integral with each other.

Note that in addition to the embodiments of the invention described above, there are many other variants. Note also that the embodiments are merely examples and do not limit the scope of the invention or the uses thereof, or the possible configurations thereof. On the contrary, although the above description enables a person skilled in the art to carry out the present invention at least according to an exemplary configuration thereof, note that many variations of the components described are possible without exceeding the scope of the invention as defined in the attached claims, interpreted literally and/or according to their legal equivalents.

REFERENCE NUMBER LIST

Ref No. Description 1 unit
2 central hub
3 tubular body
4 free end of the tubular body
5 shaped profile of the central hub
5a plurality of teeth
6 external threaded profile
7 input edge
8 groove
9 shoulder
10 single central nut
11 main body
12 polygonal surface
13 tubular appendage
14 internal threaded profile
15 shaped profile of the single nut
15a plurality of teeth
16 input edge of said main body
17 groove axially delimiting side of the main body opposite to the input edge
20 anti-unscrewing element
21 profile radially oriented facing away from the axis (A) of the central hub so as to engage with the shaped profile of the central hub
21a plurality of teeth
22 profile radially oriented facing away from the axis (A) of the central hub so as to engage with the shaped profile of the single nut
22a plurality of teeth
40 cover
41 screws
50 center disc of a wheel
A axis (A)

The invention claimed is:

1. A wheel hub unit comprising:
a central hub provided with a first shaped profile and an external threaded profile;
a single central nut provided with a second shaped profile and an internal threaded profile; and
an anti-unscrewing element interposed between the central hub and a cover spanning across an axial end of the single central nut to prevent accidental unscrewing of the single central nut,
wherein the single central nut is removably screwed on the external threaded profile of the central hub,
wherein the first shaped profile and the second shaped profile are both radially oriented facing towards an axis (A) of the central hub, and in combination, the anti-unscrewing element is provided with a third shaped profile and a fourth shaped profile,
wherein the third shaped profile is radially oriented facing away from the axis (A) of the central hub to engage with the first shaped profile,
wherein the fourth shaped profile is radially oriented facing away from the axis (A) of the central hub to engage with the second shaped profile.

2. The wheel hub unit according to claim 1, wherein the first shaped profile and the external threaded profile are arranged substantially axially in series along the axis of the central hub and are radially oriented facing away from one another.

3. The wheel hub unit according to claim 2, wherein the third shaped profile and the fourth shaped profile have respective average circumferences that are different to one another, and wherein an average circumference of the third shaped profile is of dimensions smaller than the dimensions of an average circumference of the fourth shaped profile.

4. The wheel hub unit according to claim 1, wherein all the shaped profiles are formed by a plurality of teeth uniformly distributed around the axis (A), and a number of teeth of the first shaped profile and the third shaped profile is different from a number of teeth of the second shaped profile and the fourth shaped profile.

5. An anti-unscrewing device for wheel hub unit comprising:
a wheel support that includes an external threaded profile; and
an axial locking element that includes:
a cover extending across an axial end of the axial locking element,
an internal threaded profile,
a first shaped profile radially orientated towards an axis (A) of the wheel support and made in the wheel support,
a second shaped profile radially orientated towards an axis (A) of the wheel support and made in the locking element,
a third shaped profile radially oriented facing away from an axis (A) of the wheel support to engage with the first shaped profile to make the wheel support and the locking element angularly integral with each other, and
a fourth shaped profile radially oriented facing away from an axis (A) of the wheel support to engage with the second shaped profile,
wherein the internal threaded profile is removeably screwed onto the external threaded profile,
wherein the anti-unscrewing device is interposed between the wheel support and the cover to prevent accidental unscrewing of the axial locking element,
wherein engagement between the third shaped profile and the first shaped profile as well as engagement between the fourth shaped profile and the second shaped profile make the wheel support and the locking element angularly integral with each other.

6. The anti-unscrewing device according to claim 5, wherein all the shaped profiles are formed by a plurality of teeth uniformly distributed around the axis (A), and wherein a number of teeth of the first shaped profile and the third shaped profile are different from a number of teeth of the second shaped profile and the fourth shaped profile.

* * * * *